(12) United States Patent
Werner et al.

(10) Patent No.: US 7,730,018 B2
(45) Date of Patent: Jun. 1, 2010

(54) SYSTEM AND METHOD FOR PROCESSING EVENT PREDICATES

(75) Inventors: Duncan Werner, New York, NY (US); Robert Mark Wyman, New York, NY (US)

(73) Assignee: Technology Financial, LLC, Bow, WA (US)

( * ) Notice: Subject to any disclaimer, the term of this patent is extended or adjusted under 35 U.S.C. 154(b) by 51 days.

(21) Appl. No.: 11/844,204

(22) Filed: Aug. 23, 2007

(65) Prior Publication Data

US 2007/0294285 A1    Dec. 20, 2007

Related U.S. Application Data

(62) Division of application No. 11/318,000, filed on Dec. 22, 2005, now Pat. No. 7,346,603.

(60) Provisional application No. 60/640,818, filed on Dec. 30, 2004.

(51) Int. Cl.
  *G06F 17/30*  (2006.01)
  *G06F 15/16*  (2006.01)

(52) U.S. Cl. .............................. 707/102; 707/2; 707/6; 709/203

(58) Field of Classification Search .................... 707/2, 707/3, 4, 6, 102; 709/203
See application file for complete search history.

(56) References Cited

U.S. PATENT DOCUMENTS

| | | | | |
|---|---|---|---|---|
| 5,664,172 A * | 9/1997 | Antoshenkov | .................. | 707/4 |
| 5,706,495 A * | 1/1998 | Chadha et al. | .................. | 707/2 |
| 6,564,212 B2 * | 5/2003 | Koskas | ........................... | 707/3 |
| 6,681,220 B1 * | 1/2004 | Kaplan et al. | .................. | 707/4 |
| 6,728,715 B1 * | 4/2004 | Astley et al. | .................. | 707/10 |
| 6,839,730 B1 * | 1/2005 | Ramabhadran | ............. | 709/201 |
| 6,925,457 B2 * | 8/2005 | Britton et al. | .................. | 707/1 |
| 7,162,467 B2 * | 1/2007 | Eshleman et al. | ............. | 707/3 |
| 7,200,675 B2 * | 4/2007 | Wang et al. | ................. | 709/238 |
| 7,313,554 B2 * | 12/2007 | Chen et al. | ..................... | 707/3 |
| 2006/0059165 A1 * | 3/2006 | Bosloy et al. | ................. | 707/10 |

* cited by examiner

*Primary Examiner*—Shahid A Alam
(74) *Attorney, Agent, or Firm*—Fay Kaplun & Marcin, LLP

(57) ABSTRACT

Described is a method comprising initializing a first set of bits corresponding to a first plurality of predicate indices to a first value, and initializing a second set of bits corresponding to a second plurality of predicate indices to a second value. A subscription is processed. The subscription includes a plurality of subscription predicates, each of the subscription predicates associated with corresponding predicate indices in one of the first and second pluralities. An event is processed. The event includes an event predicate. When the event predicate matches a first predicate index in the first plurality, a first bit associated with the first predicate index is toggled to the second value. When the event predicate matches a second predicate index in the second plurality, a second bit associated with the second predicate index is toggled to the first value. When each bit associated with the corresponding predicate indices is the second value, the event is outputted to a source of the subscription.

12 Claims, 4 Drawing Sheets

SYSTEM AND METHOD FOR PROCESSING EVENT PREDICATES

PRIORITY CLAIM

This application is a Divisional application of U.S. patent application Ser. No. 11/318,000 filed on Dec. 22, 2005, now U.S. Pat. No. 7,346,603 entitled "System and Method for Processing Event Predicates" which claims priority to U.S. Provisional Patent Application Ser. No. 60/640,818filed on Dec. 30, 2004. The entire disclosure of these prior applications is considered as being part of the disclosure of the accompanying application and hereby expressly incorporated by reference herein.

BACKGROUND

A conventional event processing system attempts to match a requested event within a stream of events. The stream may comprise hundreds of thousands to millions of events output in realtime. For example, in a stream of stock prices, a stock symbol (e.g., IBM) and a corresponding price (e.g., $40.00/share) are event predicates which comprise the event, i.e., a change in the price of the stock. The conventional system describes efficient algorithms for matching the requested event when it comprises equals predicates, i.e., Symbol=IBM and Price=40.00. However, the system has a significant failing in processing matches for not-equals predicates, i.e., Symbol!=IBM, because the system utilizes the same approach to processing matches for equals and not-equals predicates. However, while processing events is a one-to-one mapping for the equals predicates, matching the not-equals predicates requires resolution of any arbitrary value from the stream. Processing the not-equals predicates would require comparisons to each of the equals predicates to check for a match, which eliminates the efficiency of a one-to-one mapping as in processing of the equals predicates. Thus, there is a need for an efficient method for processing requested events which comprise both equals and not-equals predicates.

SUMMARY OF THE INVENTION

The present invention relates to a system and method for processing event predicates. The method comprises initializing a first set of bits corresponding to a first plurality of predicate indices to a first value, and initializing a second set of bits corresponding to a second plurality of predicate indices to a second value. A subscription is processed. The subscription includes a plurality of subscription predicates, each of the subscription predicates associated with corresponding predicate indices in one of the first and second pluralities. An event is processed. The event includes an event predicate. When the event predicate matches a first predicate index in the first plurality, a first bit associated with the first predicate index is toggled to the second value. When the event predicate matches a second predicate index in the second plurality, a second bit associated with the second predicate index is toggled to the first value. When each bit associated with the corresponding predicate indices is the second value, the event is outputted to a source of the subscription.

DETAILED DESCRIPTION

Figure 1:
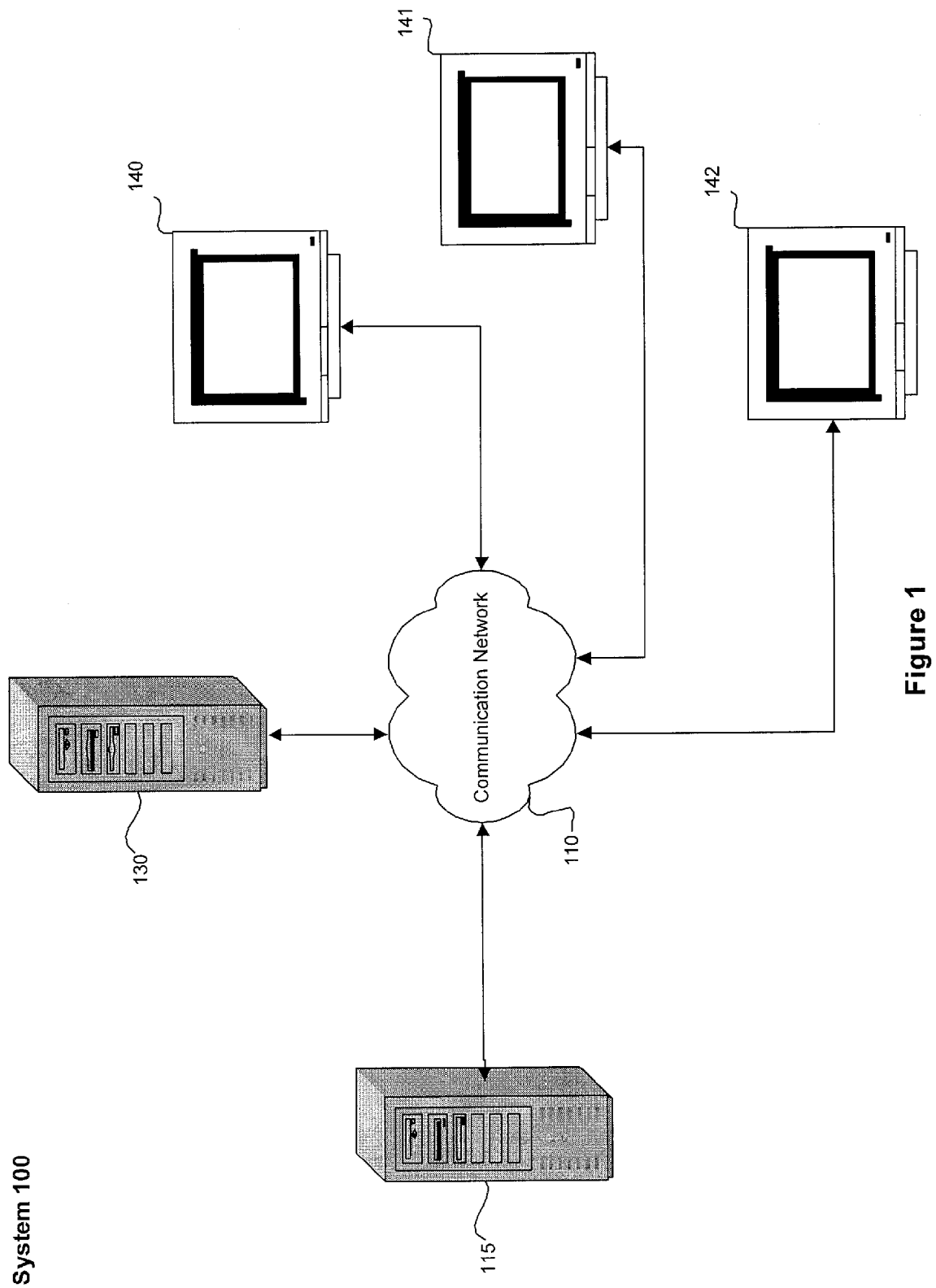
FIG. 1 shows an exemplary system according to the present invention.

The present invention may be further understood with reference to the following description and the appended drawings, wherein like elements are provided with the same reference numerals. The present invention comprises a system and method for processing event predicates.

There are many well known systems and methods of processing event predicates. Such systems may be used, e.g., for processing specific information (e.g., publications) from the Internet. For example, a typical system may be used to match the occurrence of one or more event predicates (e.g., a stock symbol and a particular price) within an event (e.g., a publication of stock transactions and/or a real-time stock exchange ticker). The system may output a result when a sale of the particular stock symbol is located (i.e., within the event) at the specified stock price. Such an occurrence of a specified event predicate may be referred to as an "equals" predicate.

Some systems are capable of supporting "not-equals" predicates or the non-occurrence of a specified predicate in an event. For example, a request may include a stock symbol and any price but a specified price. Each specified predicate (e.g., name-value pair) must be compared against every predicate in the predicate index. When subscriptions and event both contain a large number of predicates, this results in massively more complexity. Those of skill in the art will understand that the large number of comparison operations result in increased expense. In the exemplary embodiment, the present invention may require only two comparisons per predicate.

Another problem arises when a requirement exists to support events which include more than one predicate for a single event attribute. An attribute may be a general categorization of predicates (e.g., stock symbols, stock prices, and/or industry-codes). For instance, a stock-market event such as that used in the above example may contain more than one instance of an "industry-code" attribute. Such an event might include the following predicates: "Symbol=AOL, Price=75, Industry-code=Software, Industry-code=Computers." A subscription might then be created with the following match string: "Industry-code!=Software AND Price=75." Assuming, for example, that the event predicates are processed in the order that they appear in the event, the system would first process the event predicate "Industry-code=Software". The processing of that event predicate would result in all bits (e.g., in a BitVector) which do not correspond to the "Industry-code=Software" predicate being set to "1" (i.e., true). The single bit in the BitVector associated with the predicate "Industry-code=Software" would remain unset, in the default 0 (i.e., false) state. Then, when the next event predicate is processed, the system would set all BitVector bits that did not correspond to the event predicate "Industry-code=Computers" to "1" or "true." Unfortunately, the processing of the second event predicate would over-write the results of processing the first event predicate, and the event, thought a match to the match string, would not be returned to the subscriber. Thus, a final state of each bit is determined by the order of processing of event predicates, which may result in inconsistency.

The present invention described herein includes an innovative system (e.g., a publish-subscribe system) and method for processing existing and real-time information. In particular, the present invention is useful for processing information generated (e.g., published) asynchronously from the creation of a subscription. The present invention further provides an improvement to existing methods including solutions to the problems discussed above (i.e., the relatively high expense of supporting not-equals predicates and the inability to support multiple instances of a single attribute in a single event).

FIG. 1 shows an exemplary system 100 according to the present invention. The system 100 includes a communication network 110 (e.g., an intranet, a wired/wireless local/wide area network, and/or the Internet). The communication network 110 may be in communication with a server 115 which may include a processor (not shown) and at least one software server 120 (shown in FIG. 2). At least one data provider 130 (e.g., publisher) may be coupled to the communications network 110. The system 100 may further include any number of users (e.g., users 140-142) having access to the server 115 and the data provider 130 via the communication network 110.

Figure 2:
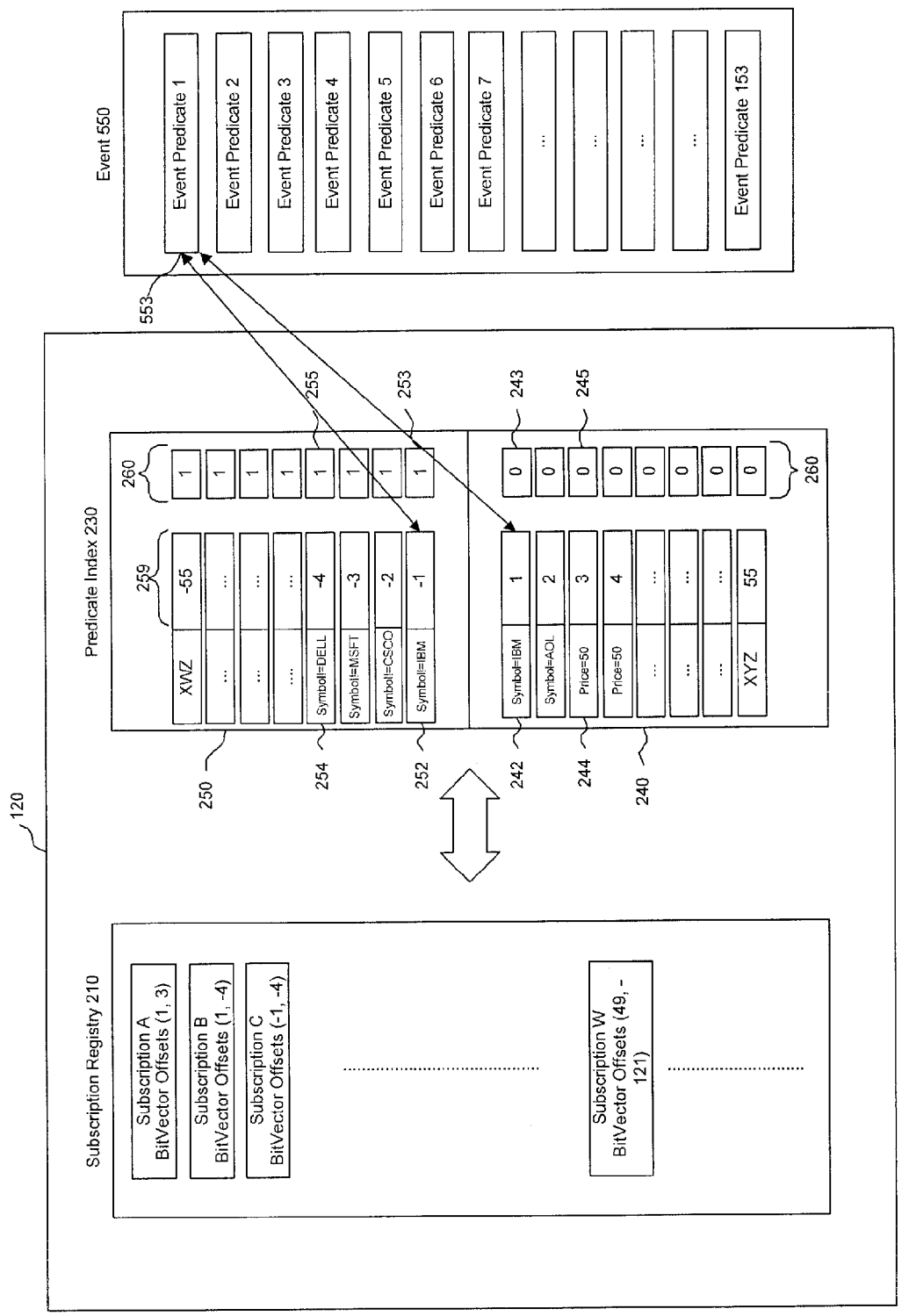
FIG. 2 shows an exemplary embodiment of a software server according to the present invention.

FIG. 2 shows an exemplary embodiment of the software server 120. In this embodiment, the software server 120 may include a subscription registry 210 and a predicate index 230. The predicate index 230 may include a plurality of sub-indexes including, for example, an equals predicate index 240 and a not-equals predicate index 250. The predicate index 230 may further include a BitVector 260 which includes a bit value associated with each subscription predicate in the predicate index 230.

Figure 3:
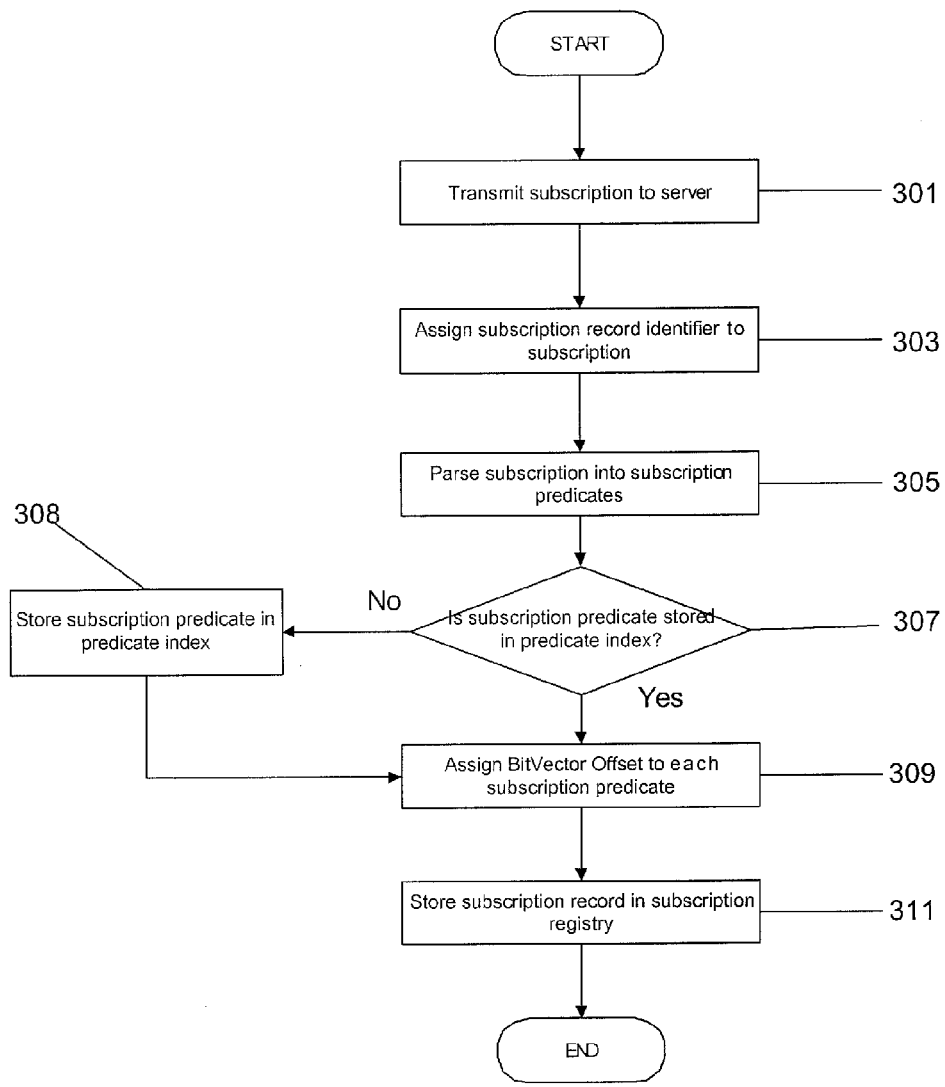
FIG. 3 shows an exemplary method for registering a subscription according to the present invention.

FIG. 3 shows an exemplary method 300 for registering a subscription according to the present invention. The method 300 is described with reference to the system 100 shown in FIG. 1, and the exemplary embodiment of the software server 120 shown in FIG. 2. However, those skilled in the art will understand that other systems having varying configurations may also be used to implement the exemplary method.

In step 301, a user (e.g., the user 140) generates and transmits a subscription to receive information from the data provider 130. In one embodiment, the data provider 130 publishes realtime information (e.g., stock transactions) which is available to the server 115, the users 140-142 and/or any other device/application with access to the communications network 110. The subscription may be transmitted to the server 115 (and/or the software server 120) via the communications network 110. For example, the user 140 may enter the subscription including one or more subscription predicates, such as stock symbols (e.g., IBM, DELL) and stock prices. Each subscription predicate may be either an equals predicate or a not-equals predicate. For example, the subscription may request to receive an occurrence of the stock symbol IBM at a stock price of $50 (i.e., two equals predicates: Symbol=IBM, Price=50). Also, the user 141 may create a further subscription for the occurrences of the stock symbol IBM and non-occurrences of the stock symbol DELL (i.e., the equals predicate Symbol=IBM and the not-equals predicate Symbol!=DELL).

In step 303, the subscription is assigned a unique subscription identifier. For example, the software server 120 may assign a subscription identifier "A" (i.e., Subscription A) to the IBM at $50 subscription and a subscription identifier "B" (i.e., Subscription B) to the "IBM, but not DELL."

In step 305, the subscription is parsed to identify the subscription predicate(s) which compose the subscription. For example, the Subscription A may be parsed into a first subscription predicate 242 (e.g., "Symbol=113M") and a second subscription predicate 244 (e.g., "Trice=75"). In this embodiment, both the first and second subscription predicates 242, 244 are equals predicates. However, those of skill in the art will understand that the subscription may include any number and/or type of subscription predicates.

In step 307, it is determined whether the first and second subscription predicates 242, 244 are stored in the predicate index 230. That is, the first and second predicates may be duplicates of previously stored subscription predicates. For example, if the Subscription B (e.g., IBM and not DELL) is parsed after the Subscription A (e.g., IBM at $50), the subscription predicate "Symbol=IBM" in the Subscription B may not be stored in the predicate index 230, because it would be a duplicate of the first subscription predicate 242 of the Subscription A. Those of skill in the art would understand that storing duplicates of the previously stored predicates would require an increased storage capacity at the server 115, as well as disadvantageously increasing a total processing time of the subscription(s), as will be described below. If the first and/or second subscription predicates 242, 244 are not included in the predicate index 230, a new entry may be created therein, as seen in step 308.

In step 309, a unique value (e.g., a BitVector Offset 259) may be assigned to each subscription predicate stored in the predicate index 230. The BitVector Offset 259 is an offset for the bit value in the BitVector 260 which corresponds to the subscription predicate. For example, the first subscription predicate 242 ("Symbol=IBM") is assigned the BitVector Offset of 1 in the equals predicate index 240, and a third subscription predicate 254 (e.g., "Symbol!=DELL") is assigned the BitVector Offset of −4 in the not-equals predicate index 250. Those of skill in the art will understand that, if at the time that the third event predicate 254 is being inserted into the predicate index 260 and a last-inserted predicate index has already had the −3 assigned thereto, the BitVector Offset assigned to the new event predicate 254 may be "−4."

In one embodiment, the BitVector Offsets 259 assigned to the subscription predicates in the equals predicate index 240 are positive integers, and the BitVector Offsets 259 assigned to the subscription predicates in the not-equals predicate index 250 are negative integers. According to the present invention, the BitVector Offsets 259 of the equals and not-equals predicate indices 240, 250 allow for use of a bulk bit-setting operation. For example, prior to event processing, as will be described below, each bit value in the BitVector 260 which corresponds to the equals predicate index 240 may be set to a first predetermined value (e.g., "0"), whereas each bit value in the BitVector 260 corresponding to the not-equals predicate index 250 may be set to a second predetermined value (e.g., "1").

In step 311, a subscription record for the subscription is generated and stored in the subscription registry 210. The subscription record may include the subscription identifier and the BitVectorOffset(s) for the subscription predicate(s) included in the subscription. For example, the subscription record for the IBM at $50 subscription includes the Subscription identifier A and the BitVector Offsets 1 and 3, which correspond to the first and second subscription predicates 242 (Symbol=IBM), and 244 (Price=50), respectively, in the equals predicate index 240.

Figure 4:
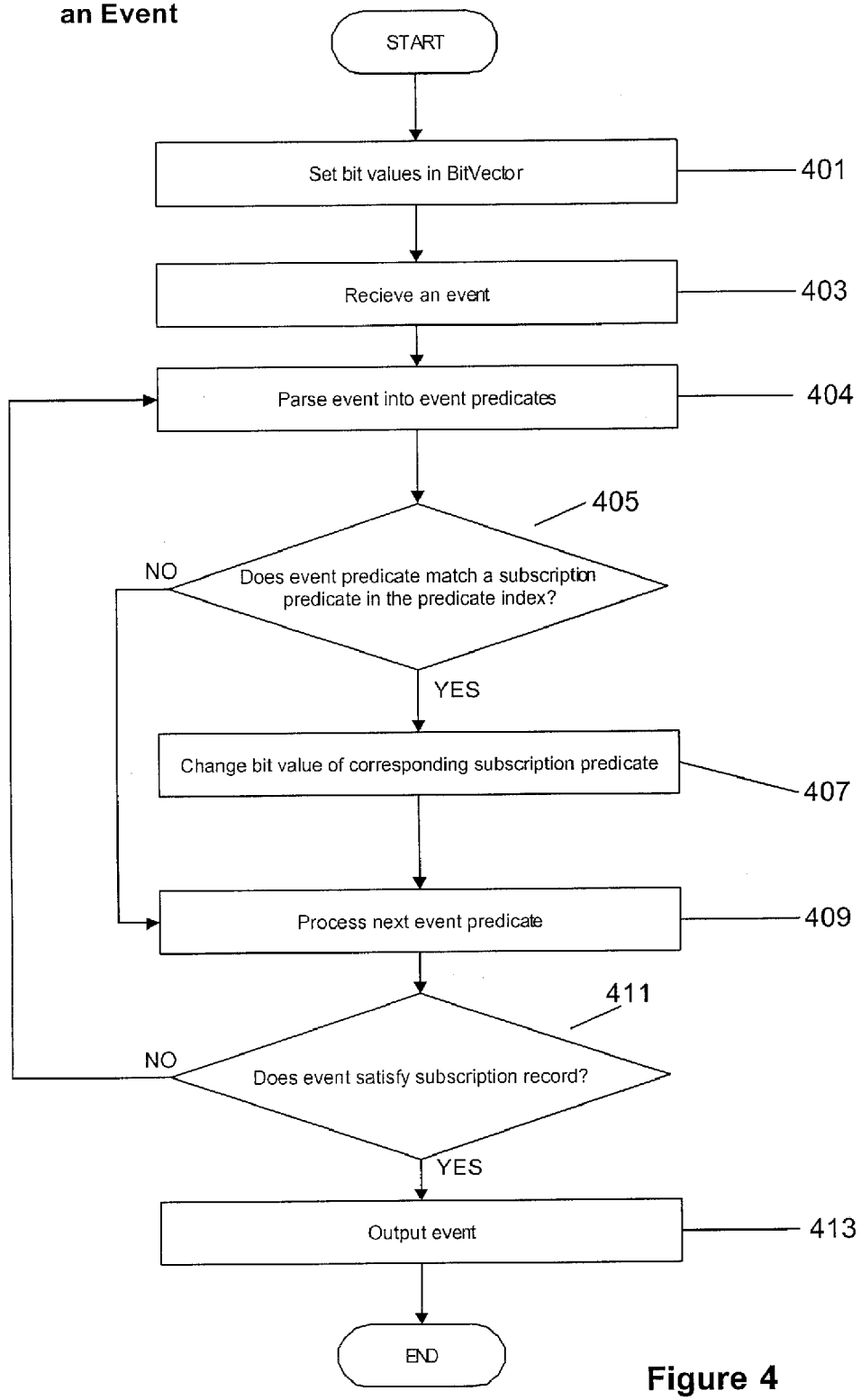
FIG. 4 shows an exemplary method for processing an event according to the present invention.

FIG. 4 shows an exemplary method 400 for processing an event 550 according to the present invention. In one embodiment, the event 550 is a publication of a stock transaction by the data provider 130. The software server 120 may receive the event 550 via a direct connection to the data provider 130 and/or may receive the publication via the communication network 110. The method 400 will be described with reference to the system 100 shown in FIG. 1 and the software server 120 shown in FIG. 2. However, those skilled in the art will understand that other systems having varying configurations may also be used to implement the exemplary method.

In step 401, each of the bit values in the BitVector 260 which correspond to the subscription predicates in the equals predicate index 240 is set to "0" or false, and each of the bit values corresponding to the subscription predicates in the not-equals predicate index 250 is set to "1" or true. As described above, this may be accomplished utilizing the bulk bit-setting operation on the BitVector 260. As shown in FIG. 2, a bit value 243 corresponding to the first subscription predicate 242 is set to 0, whereas a bit value 255 corresponding to the third subscription predicate 254 is set to 1.

In step 403, the software server 120 receives the event 550 from the data provider 130 and/or the communication network 110. The event 550 may be any publication and/or data (e.g., a document, a file, a data stream, a database, etc.). As understood by those of skill in the art, the software server 120 may receive events from any number of data providers. As shown in FIG. 2, a single event may include one or more event predicates. For example, the event 550 includes 153 separate event predicates.

In step 404, the event 550 is parsed to extract the event predicates contained therein. For example, the event 550 may include information corresponding to a change in the price of the IBM stock, and, as such, may include an event predicate 553, "Symbol=IBM." As understood by those of skill in the art, the event predicates within each event may be processed in parallel or in series.

In step 405, the software server 120 determines whether the event predicate 553 matches any subscription predicate in the predicate index 230. For example, when the event predicate 553 is the "Symbol=IBM," a search of the predicate index 230 yields the first subscription predicate 242. Also, as shown in FIG. 2, a further subscription predicate 252 from a further subscription (e.g., Subscription C) is located which corresponds to a not-equals predicate (e.g., Symbol!=IBM). Thus, the search of the predicate index 230 may return two matches, the first subscription predicate 242 and the further subscription predicate 252. That is, in one embodiment, each event predicate may be matched to at most two subscription predicates, the equals predicate and the not-equals predicate.

In step 407, the bit value 243 in the BitVector 260 corresponding to the first subscription predicate 242 is changed to "1" or "true." Similarly, a bit value 253 in the BitVector 260 corresponding to the further subscription predicate 252 is set to "0" or "false."

In step 409, the event predicate 553 was not matched to any subscription predicate or the bit value of the matching subscription predicate was changed, so the next event predicate in the event 550 is processed. Those of skill in the art will understand that steps 405-409 may be repeated for each event predicate (e.g., event predicates 1-153) in the event 550. After all (or a selected number) of the event predicates in the event 550 are processed, a modified BitVector 260 is generated which corresponds to the event 550.

In step 411, it is determined whether the event 550 satisfies any of the subscription records. In one embodiment, each subscription record in the subscription registry 210 is compared to the predicate index 230 and the modified BitVector 260. For example, the Subscription A contains the BitVector Offsets 1 and 3 which correspond to the first subscription predicate 242 (e.g., Symbol=IBM) and the second subscription predicate 244 (e.g., Price=50). The event 550 may be considered a match if the bit value in the modified BitVector 260 for each of the first and second subscription predicates 242 and 244 has changed to "1" or "true." If all of the subscription predicates in the subscription record are matched, the event 550 is outputted to the user (step 413). If the subscription record is not matched, a next event is processed (back to step 403).

As described above, the system and method according to the present invention is able to efficiently provide for "correct" defaults for both equals and not-equals predicates. Thus, the present system and method ensures that, for a negative predicate, only a single comparison operation need be performed during event processing for each event predicate processed. In addition, the improved system and method according to the present invention supports the evaluation of multiple event predicates on the same subscription predicate without the "over-writing" problem which is a limitation of known systems and methods.

One skilled in the art would understand that the present invention may also be successfully implemented in various other embodiments. Accordingly, various modifications and changes may be made to the embodiments without departing from the broadest spirit and scope of the present invention as set forth in the claims that follow. The specification and drawings are accordingly to be regarded in an illustrative rather than restrictive sense.

What is claimed is:

1. A method, comprising:
    entering a subscription that includes at least one subscription predicate corresponding to one of an equals predicate and a not-equals predicate; and
    receiving an event from a remote location, the event including at least one event predicate corresponding to the at least one subscription predicate, wherein:
        the at least one event predicate corresponds to the at least one subscription predicate if a bit value in a modified bit vector for the at least one event has changed from a default bit value in a default bit vector for the at least one subscription predicate,
        for each non-equals subscription predicate, the default bit value is a first value, and for each equals subscription predicate, the default bit value is a second value,
        the event is parsed to extract the at least one event predicate therefrom, and
        if the at least one event predicate is determined to correspond to the at least one subscription predicate, the event is outputted to the user computer.

2. The method of claim 1, wherein the step of entering includes entering a subscription via a user computer.

3. The method of claim 2, wherein the user computer sends the subscription to a remote server via a communications network.

4. The method of claim 3, wherein the subscription is to receive information relating to the event from a data provider in communication with the remote server.

5. The method of claim 4, wherein the information relating to the event relates to a publication of a stock transaction.

6. The method of claim 5, wherein:
    the parsing of the event is done by the remote server parses the event to extract the at least one event predicate therefrom,
    the determining of whether the at least one event predicate corresponds to the at least one subscription predicate is done by the remote server, and
    the outputting of the event to the user computer is done by the remote server.

7. A system, comprising:
    means for entering a subscription that includes at least one subscription predicate corresponding to one of an equals predicate and a not-equals predicate; and means for receiving an event from a remote location, the event including at least one event predicate corresponding to the at least one subscription predicate, wherein:

the at least one event predicate corresponds to the at least one subscription predicate if a bit value in a modified bit vector for the at least one event has changed from a default bit value in a default bit vector for the at least one subscription predicate, for each non-equals subscription predicate, the default bit value is a first value, and for each equals subscription predicate, the default bit value is a second value, the event is parsed to extract the at least one event predicate therefrom, and if the at least one event predicate is determined to correspond to the at least one subscription predicate, the event is outputted to the user computer.

8. The system of claim 7, wherein the step of entering includes entering a subscription via a user computer.

9. The system of claim 8, wherein the user computer sends the subscription to a remote server via a communications network.

10. The system of claim 9, wherein the subscription is to receive information relating to the event from a data provider in communication with the remote server.

11. The system of claim 10, wherein the information relating to the event relates to a publication of a stock transaction.

12. The system of claim 11, wherein:

the parsing of the event is done by the remote server parses the event to extract the at least one event predicate therefrom, the determining of whether the at least one event predicate corresponds to the at least one subscription predicate is done by the remote server, and the outputting of the event to the user computer is done by the remote server.

* * * * *